United States Patent [19]
Kastl et al.

[11] Patent Number: 6,150,436
[45] Date of Patent: Nov. 21, 2000

[54] MATERIAL CONTAINING POLYREACTIONS PRODUCTS AND METHOD FOR THE PRODUCTION THEREOF

[75] Inventors: Bernd Kastl, Bietigheim-Bissingen; Milko Ess, Freiberg; Hanns-Jörg Mauk, Mundelsheim, all of Germany

[73] Assignee: DLW Aktiengesellschaft, Germany

[21] Appl. No.: 09/331,833

[22] PCT Filed: Dec. 23, 1997

[86] PCT No.: PCT/EP97/07255

§ 371 Date: Jun. 24, 1999

§ 102(e) Date: Jun. 24, 1999

[87] PCT Pub. No.: WO98/28356

PCT Pub. Date: Jul. 2, 1998

[30] Foreign Application Priority Data

Dec. 24, 1996 [DE] Germany .................. 196 54 279

[51] Int. Cl.$^7$ .............. C08L 63/00; C08L 1/00; C08G 63/42; C08K 3/26; B32B 27/36
[52] U.S. Cl. .............. 523/440; 524/13; 524/16; 524/425; 524/914; 525/531; 525/532; 528/296; 428/482
[58] Field of Search ................ 523/440; 524/13, 524/16, 425, 914; 525/531, 532; 528/296; 428/482

[56] References Cited

U.S. PATENT DOCUMENTS 4,056,403  11/1977  Cramer et al. .
4,686,270  8/1987  Van der Linde et al. .

FOREIGN PATENT DOCUMENTS

| 0188833 | 7/1986 | European Pat. Off. . |
| 0228116 | 10/1988 | European Pat. Off. . |
| 0377258 | 7/1990 | European Pat. Off. . |
| 0539 916 | 5/1993 | European Pat. Off. . |
| 0544058 | 6/1993 | European Pat. Off. . |
| 132 675 | 10/1978 | Germany . |
| 1694609 | 11/1991 | U.S.S.R. . |
| 1049100 | 11/1966 | United Kingdom . |

*Primary Examiner*—Tae Yoon
*Attorney, Agent, or Firm*—Womble Carlyle Sandridge & Rice, PLLC

[57] ABSTRACT

This invention relates to materials containing polyreaction products, which contain reaction products of dicarboxylic acids or polycarboxylic acids or derivatives thereof with epoxidation products of carboxylic acid esters and at least one filler, methods for the production thereof, and the use thereof for the production of planar structures based on renewable raw materials.

23 Claims, No Drawings

MATERIAL CONTAINING POLYREACTIONS PRODUCTS AND METHOD FOR THE PRODUCTION THEREOF

FIELD OF THE INVENTION

This invention relates to materials containing polyreaction products, methods for the production thereof, and the use thereof for the production of planar structures or sheet materials, respectively, based on renewable raw materials.

BACKGROUND OF THE INVENTION

Linoleum has long been known as a resilient floor covering based on renewable raw materials. Because of its natural constituents, linoleum has achieved great structural-biological and environmental importance. The production of linoleum coverings, however, requires in the last stage of the process a heat treatment that lasts several weeks, the "ripening time."

Coating masses that are based on renewable raw materials and serve for the coating of planar structures or of release paper are known from DE-A-41 35 664. The coating masses consist of a combination of epoxidation products of esters of unsaturated fatty acids and partial esters of polycarboxylic acids with polyether polyols as well as a hydrophobing agent. These coating masses are used for the production of floor coverings. It is disadvantageous, however, that the top layer of coverings produced in this way is very rough and non-transparent. Further, the back coatings require a complicated production with more costly separating paper or release paper, has no foam, and thus offer no walking comfort. Furthermore, it turns out that the surface of these coverings is not sufficiently dirt-repellent and exhibits poor complete curing.

Spreadable coating masses for the production of planar structures based on renewable raw materials are known from WO 96/15203. The production of these planar structures, however, is restricted to spreading or coating processes because of the use of so called "coating pastes" that contain the coating masses.

OBJECTS AND SUMMARY OF THE INVENTION

Thus it is an object of the present invention to provide a new system for the production of planar structures or sheet materials based on renewable raw materials, which system eliminates, in particular, the time-intensive ripening time of linoleum coverings and is easy to produce, for example, by press-molding, calendering or extrusion. Further, planar structures produced in this way should exhibit excellent material properties.

DETAILED DESCRIPTION OF THE INVENTION

This object is solved by the embodiments characterized in the Claims. In particular, there is provided a material containing polyreaction products, which contains as binder the reaction product of at least one dicarboxylic or polycarboxylic acid or derivatives thereof, or of a mixture thereof with at least one epoxidation product of a carboxylic acid ester, or of a mixture of these epoxidation products, and at least one filler.

The dicarboxylic acids or polycarboxylic acids or derivatives thereof preferably contain at least one double bond per molecule.

Maleic acid, itaconic acid, fumaric acid, succinic acid, methylsuccinic acid, malic acid or furandicarboxylic acid, or a mixture thereof containing at least two of these acids can preferably be used as dicarboxylic acid. Acids with three or more carboxyl groups such as, for example, citric acid and aconitic acid can preferably be used as polycarboxylic acids.

Anhydrides or partial esters or derivatives having at least one free carboxyl group can be used as derivatives of the dicarboxylic acids or polycarboxylic acids. The alcohol component of the partial esters is not subject to special restriction, but polyols such as dipropylene glycol, propanediols, butanediols, hexanediols, hexanetriols, or pentaerythritol are preferably used as alcohol component.

In an especially preferred embodiment, a mixture of a partial ester of maleic anhydride and dipropylene glycol together with citric acid is used as crosslinking agent, the content of citric acid being up to 50 percent by weight, more preferably up to 25 percent by weight, relative to the total quantity of crosslinking agent.

Epoxidized linseed oil, epoxidized soybean oil, epoxidized castor oil or epoxidized rape-seed oil or a mixture thereof containing at least two of these epoxidized products can preferably be used as epoxidation product of a carboxylic acid ester. The afore-defined alcohols of the partial esters, such as, for example, dipropylene glycol, propanediols, butanediols, hexanediols, hexanetriols or pentaerythritol, can also be used as alcohol component of these carboxylic acid esters. The carboxylic acid component is not subject to special restriction.

In the binder according to the invention, the quantities by weight of crosslinking agent and epoxidation product are each preferably 5 to 70 percent by weight, relative to the total quantity of the material containing polyreaction products, The fillers are preferably wood dust, chalk, cork dust, barium sulfate, silicic acid, kaolin, talc, glass, textile fibers or glass fibers or plant fibers, cellulose fibers, polyester fibers or, for example, colored granulates or chips consisting of the binder according to the invention, or a mixture thereof containing at least two of these substances. Especially preferred as filler is wood dust, chalk or cork dust.

The material containing polyreaction products preferably comprises 30 to 98 percent by weight binder and 2 to 70 percent by weight of at least one filler, relative to the total quantity of the material containing polyreaction products.

Further, the material containing polyreaction products can contain at least one further additive, such as pigments for designing or patterning, expanding agents or foaming agents, and auxiliary agents. The following are examples of substances that can be used as auxiliary agents; tall oils, synthetic or natural resins such as, for example, balsamic resin, copal resins, hydrocarbon resins, and/or siccatives such as, for example, compounds of the metals Al, Li, Ca, Fe, Mg, Mn, Pb, Zn, Zr, Ce or Co, or a combination thereof containing at least two of these compounds.

The material containing polyreaction products according to the invention can also be prepared in the form of prepolymers, in which either the crosslinking agent or the epoxidation product can be present in deficiency. Such prepolymers are stable in storage and exhibit partly thermoplastic properties. The weight ratio of crosslinking agent to epoxidation product in these prepolymers preferably lies in the range from 5:1 to 1:10. Only in a subsequent step are these prepolymers of the material containing polyreaction products according to the invention then converted into the completely crosslinked material, optionally with the addition of the component present in deficiency as well as optionally further additives.

A further subject of the present invention is a method for the production of the afore-defined material containing polyreaction products, which method comprises the following steps:

(1) Pre-crosslinking of a dicarboxylic or polycarboxylic acid or of derivatives thereof or of a mixture thereof and of an epoxidation product of a carboxylic acid ester or of a mixture of these epoxidation products, in order to obtain a moldable mass, and/or (2) Compounding of the moldable mass with at least one filler, and (3) Crosslinking of the compounded mass and optionally heating to obtain this material.

In the case of the performance of step (1), the degree of crosslinking of the moldable mass after step (1) is lower than the degree of crosslinking of the material after step (3).

Surprisingly, it has turned out that, by means of pre-crosslinking of the liquid components according to step (1) of the method according to the invention, a moldable mass can be obtained that can be reprocessed into moldings after step (3) of the method according to the invention without substantial ripening time. This pre-crosslinking can be controlled, for examples by heating of the two starting substances in order to produce a binder as reaction product over a certain time interval. The term "moldable mass" in this context means both a liquid reaction product and a highly viscous reaction product as binder. The degree of crosslinking of the pre-crosslinked moldable mass after step (1) is, according to the invention, lower than the degree of crosslinking of the molded part obtained after step (3).

The molding of the compounded mass after step (2) can be performed before crosslinking in step (3) or simultaneously with crosslinking after step (3).

For example, the method for the production of the afore-defined material containing polyreaction products can also be performed as a two-stage process, a prepolymer first being prepared in a first stage by the mixing of crosslinking agent and epoxidation product with one of these components in deficiency. For the preparation of the prepolymer from the afore-defined material, either the crosslinking agent or the epoxidation product can be added in deficiency. The weight ratio of crosslinking agent to epoxidation product in the first stage preferably lies in the range from 5:1 to 1:10. Next, the prepolymer obtained in this way can be press-molded and granulated, by which means a granular product is obtained that is stable in storage and is still partly thermoplastic as a result of the composition with one component in deficiency. In the second stage, the partly thermoplastic granular product made of the prepolymer can then be completely crosslinked optionally with the addition of the component present in deficiency in the first stage as well as optionally further additives. This further crosslinking can be effected by means of conventional methods such as press-molding, for example via a jaw press, calendering processes or extrusion processes, or a combination of these methods optionally with the elevation of the temperature selected for the first stage.

A further subject of the present invention is the use of the afore-defined material or of the material obtained according to the afore-defined method for the production of a planar structure such as, for example, a floor covering, a tile, an insulating material or a wall covering. These planar structures can be present in homogeneous form. In a further embodiment, however, the afore-defined material can also be applied to a backing such as, for example, glass-fiber nonwoven fabric, paperboard, jute fabric, or a backing based on jute such as, for example, mixtures of jute nonwoven fabric and polypropylene-polyester nonwoven fabric.

An advantage of the material according to the invention is that such planar structures can be obtained by conventional methods such as press-molding, for example via a jaw press, calendering processes or extrusion processes, or a combination of these processes.

The planar structures according to the invention can, of course, also be patterned or designed; the addition of pigments or colored granular products or chips consisting of the binder according to the invention to the afore-defined material containing polyreaction products can be identified, for example, as patterning or designing methods. Thermal-transfer printing processes known in the prior art can also be performed for the patterning or designing of the planar structure according to the invention. What is more, a patterning method can be employed wherein, before the actual molding process, a patterned or printed absorbent material is applied to the moldable material consisting of the afore-defined material containing polyreaction products. In order to avoid stresses in the planar structure, a similar, likewise printed material can optionally be applied to the back side as an opposing tension. The absorbent material is preferably a cellulose nonwoven fabric consisting of, for example, regenerated cellulose fibers with high specific surface area, which is distinguished by high absorbency, high dry and wet strength, and low shrinkage. The weights of such cellulose nonwoven materials per square meter are, for example, 25 to 50 g/m$^2$. During the subsequent press-molding, part of the as yet uncrosslinked binder according to the invention penetrates the absorbent material and, after curing, forms on the top of the planar structure patterned in this way a thin cover or wearing layer, which can likewise be lacquered by the usual methods, the cover or wearing layer protecting the patterned or printed material against abrasion. One advantage of such a one-stage patterning method, among others, is that a planar structure built from the afore-defined material containing polyreaction products is arbitrarily printable, which is not the case, for example, with planar structures of linoleum.

The invention is explained in more detail on the basis of the following examples.

In the following examples, a press-molded part based on renewable raw materials is produced.

EXAMPLE 1

Epoxidized linseed oil (70 g) and a partial ester of maleic anhydride and di-propylene glycol (70 g), as liquid components for the production of the binder, as well as cobalt siccative (0.3 g) and cerium siccative (3 g) (metal content 10%), are separately weighed and pre-crosslinked for 25 min at 50° C. After cooling to room temperature, the reaction product thus obtained is added to wood dust (40 g) and calcium carbonate (20 g) as fillers and intimately mixed. After compounding, press-molded plates are prepared from the highly viscous mass so obtained, this preparation taking place in a two-jaw hydraulic press with the help of a 2 mm thick, 100 cm$^2$ metal frame and a silicone separating fabric. The ram pressure of the mold is roughly 20 bar, the temperature of the jaws 180° C., and the crosslinking time 5 min.

The plates so obtained are flexible, resilient, tack-free, and crosslinked throughout the entire cross section.

EXAMPLE 2

The preceding Example 1 was repeated except that, instead of epoxidized linseed oil and partial ester as binder, copal resin (28 g) and epoxidized linseed oil (56 g) and partial ester of maleic anhydride and dipropylene glycol (56 g) is used as binder.

Plates are obtained that are flexible, resilient, tack-free, and crosslinked throughout the entire cross section.

EXAMPLE 3

The same method as in Example 1 was carried out, except that titanium dioxide (12 g) is added to the wood dust (40 g) and calcium carbonate (20 g) and mixed in before the addition of the pre-crosslinked mass.

The plates so obtained are flexible, resilient, tack-free, and crosslinked throughout the entire cross section.

EXAMPLE 4

Epoxidized linseed oil (200 g) and a 25 percent by weight solution of citric acid in a partial ester of maleic anhydride and dipropylene glycol (100 g) are weighed out for the production of the binder with cobalt siccative (0.6 g) and cerium siccative (6 g) (metal content 10%) and mixed. This mixture is added to wood dust (80 g) and calcium carbonate (40 g) as fillers and then homogenized. After compounding, press-molded plates are prepared from the highly viscous mass so obtained, this preparation taking place in a hydraulic press with the help of a 1.5 mm thick, 1600 cm$^3$ metal frame and a silicone separating fabric, The ram pressure of the mold is roughly 10 bar, the temperature of the jaws 180° C., and the crosslinking time 8 minutes.

The plates obtained in this way are flexible, resilient, tack-free, and croselinked throughout the entire cross section.

What is claimed is:

1. A material containing polyreaction products, said material comprising:
    a binder and a filler,
    said binder comprising the reaction product of the crosslinking reaction between
        (a) the epoxidation product of a carboxylic acid ester and
        (b) a mixture comprising the partial ester of (i) a first polycarboxylic acid, said first polycarboxylic acid having at least two carboxyl groups and (ii) a second polycarboxylic acid, said second polycarboxylic acid having at least three carboxyl groups.

2. The material according to claim 1 wherein the alcohol component of said partial ester is a polyol selected from the group consisting of dipropylene glycols, propanediols, butanediols, hexanediols, hexanetriols, and pentaerythritols.

3. The material according to claim 1 wherein said first polycarboxylic acid is selected from the group consisting of maleic acid, itaconic acid, fumaric acid, succinic acid, methylsuccinic acid, malic acid, furandicarboxylic acid, and mixtures of two or more of the foregoing.

4. The material according to claim 1 wherein said second polycarboxylic acid is citric acid or aconitic acid.

5. The material according to claim 1 wherein said mixture comprises maleic anhydride and dipropylene glycol and citric acid.

6. The material according to claim 1 wherein said epoxidation product is selected from the group consisting of epoxidized linseed oil, epoxidized soybean oil, epoxidized castor oil, epoxidized rape-seed oil, and mixtures containing at least two of the foregoing epoxidation products.

7. The material according to claim 1 wherein said filler is selected from the group consisting of wood dust, chalk, cork dust, and mixtures thereof containing at least two of the foregoing.

8. The material according to claim 1, further comprising at least one additive selected from the group consisting of pigments, expanding agents and auxiliary agents.

9. The material according to claim 8 wherein the auxiliary agent is selected from the group consisting of tall oils, synthetic resins, natural resins, and siccatives.

10. A method for the production of the material according to claim 1, said method comprising:
    (a) providing a mixture comprising (i) the partial ester of a first carboxylic acid, said first carboxylic acid having two or more carboxylic functional groups, and a second carboxylic acid, said second carboxylic acid having three or more carboxylic functional groups, and (iii) the epoxidation product of a carboxylic acid ester;
    (b) pre-crosslinking said mixture to form a moldable mass;
    (c) compounding said moldable mass with a filler to form a compounded mass; and
    (d) crosslinking said compounded mass.

11. The method according to claim 10 wherein said pre-crosslinking comprises heating said mixture to a temperature of approximately 50° C. and said crosslinking comprises heating said compounded mass to a temperature of approximately 180° C.

12. The method according to claim 10 wherein said compounded mass is molded into a desired shape before said crosslinking.

13. The method according to claim 10 wherein said compounded mass is molded into a desired shape during said crosslinking.

14. The method according to claim 10 wherein said crosslinking comprises a forming step selected from the group comprising press-molding, calendaring, and extruding.

15. The planar structure formed by the method according to claim 14.

16. The method according to claim 14 wherein said pre-crosslinking comprises heating said mixture to a first temperature and said forming method further comprises heating said compounded mass to a second temperature, said second temperature being higher than said first temperature.

17. The method according to claim 16 wherein said first temperature is approximately 50° C. and said second temperature is approximately 180° C.

18. The method according to claim 14 further comprising, prior to said crosslinking, the steps:
    (c-1) shaping said compounded mass to form a structure having a relatively planar surface;
    (c-2) applying to said relatively planar surface an absorbent material capable of absorbing at least a part of said mixture whereby, after said crosslinking, said absorbent material forms a thin layer on said relatively planar surface.

19. The method according to claim 18 wherein said absorbent material comprises a nonwoven fabric.

20. The method according to claim 10 wherein, prior to said crosslinking, said moldable mass is further compounded with at least one additive selected from the group consisting of pigments, expanding agents and auxiliary agents.

21. A stable prepolymeric material for the production of a material containing polyreaction products, said prepolymeric material comprising:
    a mixture of (a) the epoxidation product of a carboxylic acid ester and (b) a crosslinking agent comprising the partial ester of a first carboxylic acid having two or more carboxylic functional groups and a second carboxylic acid having three or more carboxylic functional groups wherein one of said epoxidation product and said crosslinking agent is present in said mixture in a prepolymer ratio by weight with respect to the other in excess of the crosslinking ratio by weight at which complete crosslinking can occur.

22. The stable prepolymeric material according to claim 21 wherein said prepolymer ratio by weight of crosslinking agent to epoxidation product is in the range of from about 5.0 to about 0.1.

23. A planar structure comprising:
a first layer comprising a binder and a filler, said binder comprising the polymerization product of the crosslinking reaction between (a) an epoxidized carboxylic acid ester and (b) the partial ester of a first carboxylic acid having two or more carboxylic functional groups and a second carboxylic acid having three or more carboxylic functional groups; and
a second layer comprising a backing;
wherein said first layer and said second layer are bonded together.

* * * * *